United States Patent [19]

Takeshima et al.

[11] Patent Number: 4,549,627

[45] Date of Patent: Oct. 29, 1985

[54] POWER STEERING APPARATUS

[75] Inventors: Sadao Takeshima; Takeshi Ohe, both of Higashimatsuyama, Japan

[73] Assignee: Jidosha Kiki Co., Ltd., Tokyo, Japan

[21] Appl. No.: 506,302

[22] Filed: Jun. 21, 1983

[30] Foreign Application Priority Data

Jun. 25, 1982 [JP] Japan .................................. 57-108319

[51] Int. Cl.$^4$ ............................................. B62D 5/06
[52] U.S. Cl. .................................................... 180/142
[58] Field of Search ................. 180/142, 143, 141, 132

[56] References Cited

U.S. PATENT DOCUMENTS

| 4,392,540 | 7/1983 | Michio et al. | 180/142 |
| 4,417,640 | 11/1983 | Abe et al. | 180/142 |

FOREIGN PATENT DOCUMENTS

| 2640988 | 3/1977 | Fed. Rep. of Germany . |
| 2639853 | 3/1978 | Fed. Rep. of Germany . |
| 3100067 | 2/1982 | Fed. Rep. of Germany . |
| 2330581 | 6/1977 | France . |
| 54-9774 | 4/1979 | Japan . |
| 55-55059 | 4/1980 | Japan . |
| 57-182570 | 5/1981 | Japan . |
| 56-32145 | 7/1981 | Japan . |
| 57-114763 | 7/1982 | Japan .................................. 180/141 |
| 973402 | 10/1964 | United Kingdom . |
| 1557659 | 12/1979 | United Kingdom . |
| 2079691 | 1/1982 | United Kingdom . |
| 2086323 | 5/1982 | United Kingdom . |

Primary Examiner—John A. Pekar
Attorney, Agent, or Firm—Charles E. Pfund

[57] ABSTRACT

A power steering apparatus wherein an oil pump for actuating the power steering apparatus is controlled by a control device in accordance with an output of a sensor device detecting the running state of a motor car. The control device drives said pump when said sensor device detects that the car speed is lower than a predetermined value but stops said pump when said sensor device detects that said car is standstill while the steering wheel of the motor car is not operated.

12 Claims, 8 Drawing Figures

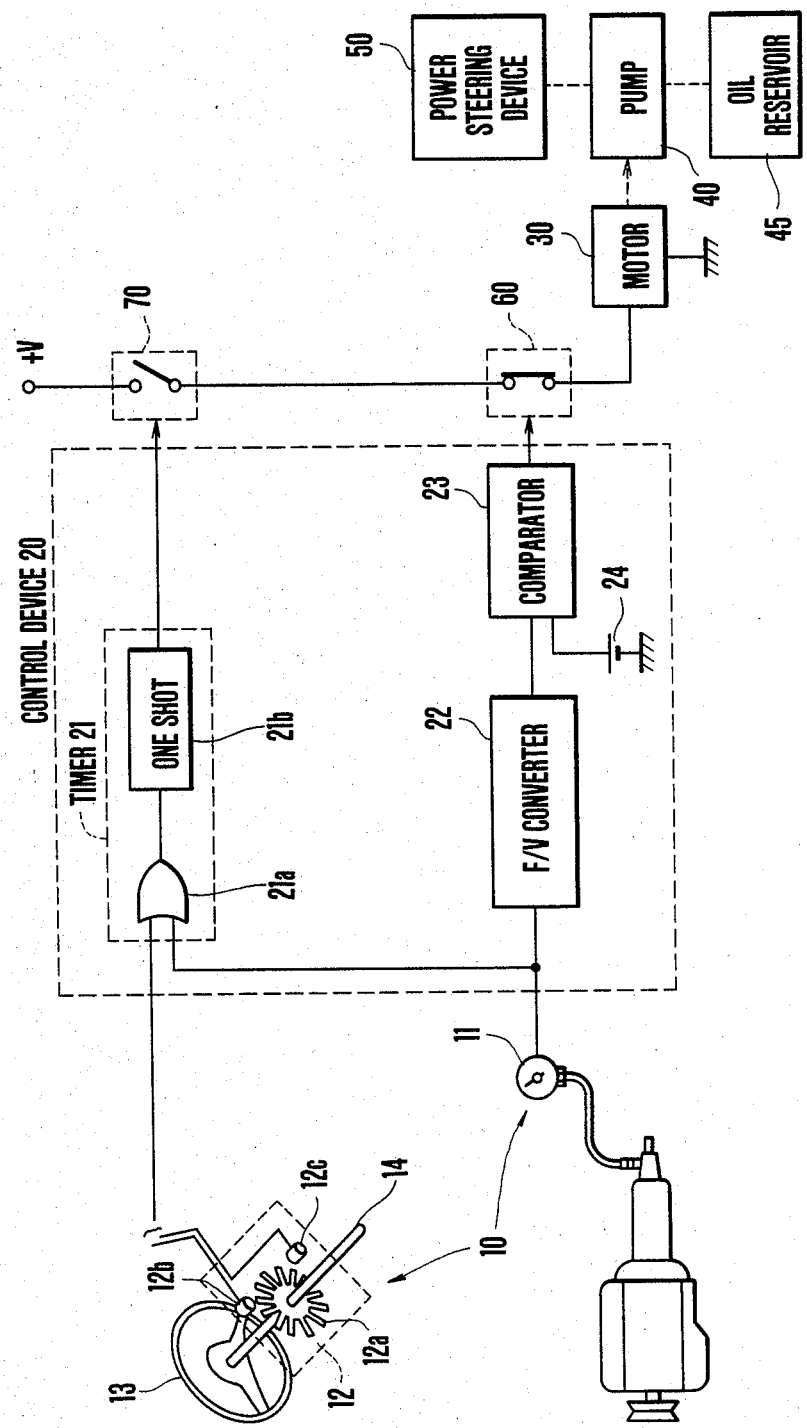
F I G. 1

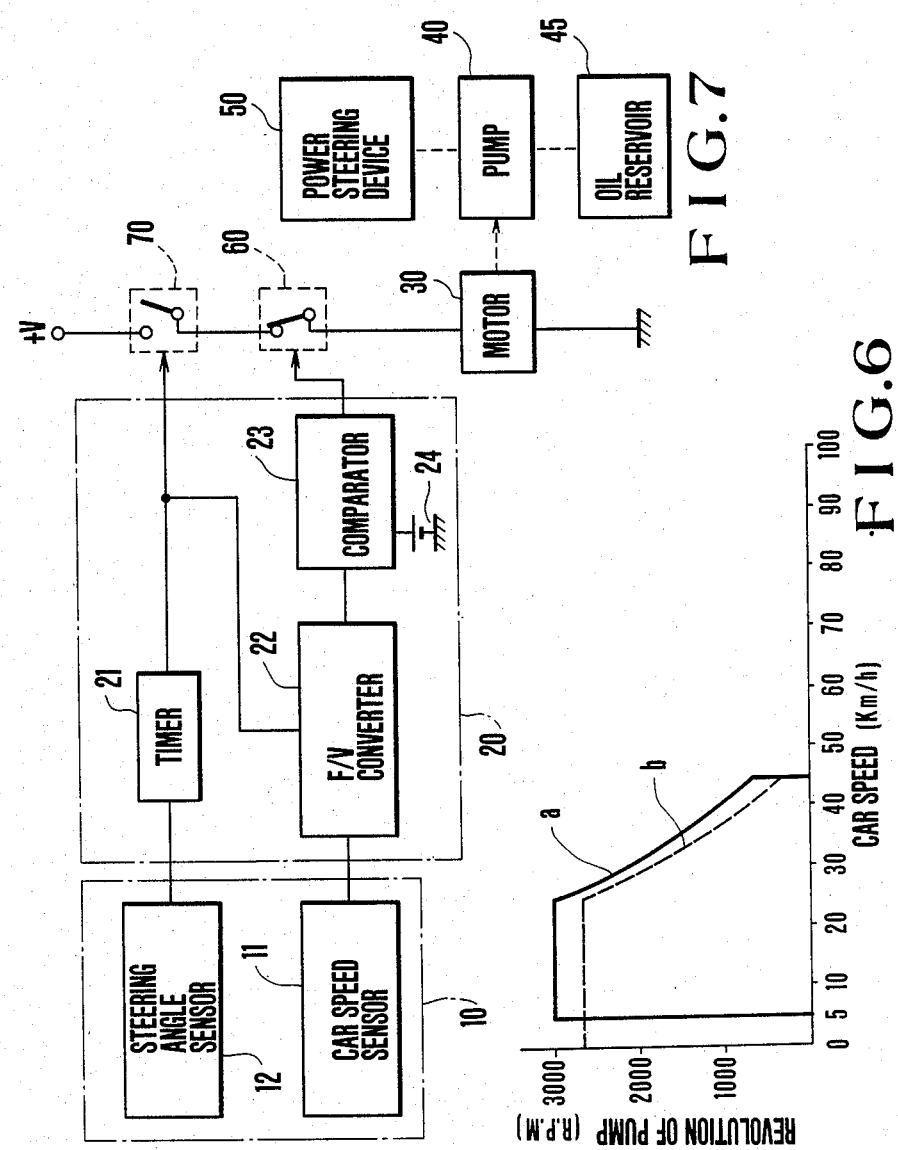

POWER STEERING APPARATUS

BACKGROUND OF THE INVENTION

This invention relates to a power steering apparatus mounted on various type of motor cars for decreasing the steering force of the driver.

Recently power steering apparatus have been mounted on various types of motor cars for the purpose of rapidly and smoothly steering the cars, thus decreasing tire of the driver.

The power steering apparatus is constructed to drive an oil pump with such power source as an internal combustion engine or an electric motor and the quantity of oil supplied to the steering device is controlled in accordance with the remaining condition of the motor car so as to smoothly and stably steer the car during a low speed running as well as a high speed running state.

With such prior art power steering apparatus, however, it is necessary to constantly operate the oil pump for the purpose of facilitating steering so that when the power steering device is not used, the power for driving the oil pump results in a power loss. Accordingly, as disclosed in German Laid Open Patent Spcification No. 2,640,988 it has been proposed to drive the oil pump only when the power steering device is operated. This system, however, lacks quick response characteristic where quick steering is necessary to avoid accident. Since small steering force is sufficient during high speed running, a method has been proposed in which the oil pump is stopped when the car speed exceeds a predetermined speed as disclosed in Japanese Patent Publication No. 32145/1981. According to this method power is wasted when the road is crowded with cars or the cars are obliged to frequently stop by signal lamps.

SUMMARY OF THE INVENTION

Accordingly it is an object of this invention to provide an improved power steering apparatus for motor cars capable of decreasing power consumption.

According to this invention there is provided a power steering apparatus wherein an oil pump for actuating the power steering apparatus is controlled by a control device in accordance with an output of a sensor detecting the running state of a motor car, characterized in that the control device drives the pump when the sensor detects that the car speed is lower than a predetermined value but stops the pump when the sensor detects that the car is standstill while the steering wheel of the motor car is not operated.

BRIEF DESCRIPTION OF THE DRAWINGS

Further objects and advantages of the invention can be more fully understood from the following detailed description taken in conjunction with the accompanying drawings in which:

FIG. 1 is a block diagram showing one embodiment of this invention;

FIG. 6 is a graph showing the relationship between the car speed and the revolution of an oil pump; and FIGS. 7 and 8 are block diagrams showing further modifications of this invention.

DESCRIPTION OF THE PREFERRED EMBODIMENT

Figure 2:
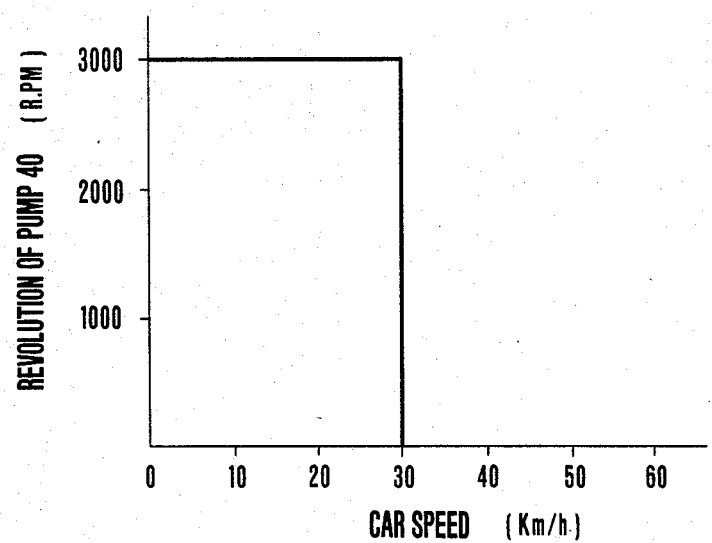
FIG. 2 is a graph showing the relationship between the car speed and the revolution of an oil pump.

The power steering apparatus embodying the invention and shown in FIG. 1 comprises a sensor device 10 which detects the running condition of a motor car. The sensor device 10 is constituted by a speed sensor 11 mounted on an engine or a wheel of the motor car to produce a speed signal of pulse numbers corresponding to the car speed, and a steering angle sensor 12 which generates a steering signal of pulse numbers corresponding to a steering angle of a steering wheel. The speed sensor 11 may be of a well known type, for example of a digital speed meter or a sensor that generates a speed signal of pulse numbers corresponding to the car speed. The steering angle sensor 12 comprises a code disc 12a secured to a steering shaft 14 of the steering wheel 13 and provided with a plurality of slits equally spaced and a light projector or a light emitting element 12b and a light receiver 12c on the opposite sides of the code disc 12a. When the steering shaft 14 is rotated the light emitted from the light projector 12a and received by the light receiver 12c is interrupted so as to produce a steering signal of the pulse numbers corresponding to the steering angle. The speed signal and the steering signal respectively generated by the speed sensor 11 and the steering angle sensor 12 are supplied to a control device 20 to be described later.

The control device 20 is constituted by a timer 21 which, when supplied with the car speed signal and the steering signal, produces a first switch control signal lasting for a predetermined time, a frequency/voltage (F/V) converter 22 which in response to the car speed signal provided from the speed sensor 11 produces a DC output voltage proportional to the pulse repetition numbers (pulse frequency) and a comparator 23 comparing the DC voltage outputted by the F/V converter 22 with a reference value 24 from a source of reference signal 24.

The timer 21 comprises an OR gate circuit 21a supplied with the car speed signal and the steering signal and a one-shot circuit 21b which produces a first control signal of a high level, for example, while it is supplied with the output of the OR gate circuit 21a.

The power steering apparatus shown in FIG. 1 further comprises an oil pump 40 driven by an electric motor 30, an oil reservoir 45, a power steering device 50 actuated by the oil pump 40, a switch 60 which is driven by the output of the comparator 23 and held closed while the car is stopped, a switch 70 driven by the output of the timer 21 and held open while the car is stopped.

The embodiment shown in FIG. 1 operates as follows. While the car is stopped and no steering is made, either of the car speed sensor 11 and the steering angle sensor 12 produces no signal, so that the timer 21 does not produce a control signal that drives the oil pump 40. Accordingly, the switch 70 is held open and the motor 30 is not operated. Under these conditions, when the driver rotates the steering wheel 13, the steering angle sensor 12 produces a steering signal and in response to this signal, the timer 21 produces a first control signal to close the switch 70. Since, at this time, the switch 60 is closed, the motor 30 is connected to a voltage source +V through the switch 60 and 70 and then would be started.

As the motor car starts to run, the car speed sensor 11 generates a car speed signal which is supplied to the timer 21. Consequently, thereafter, the timer 21 continues to generate the first control signal irrespective of the steering action to close the switch 70. At this time, since the car speed signal is also supplied to the F/V converter 22 it produces a DC voltage corresponding to the car speed signal. Unless the car speed signal exceeds a predetermined value, that is the reference value, the comparator 23 does not produce the second control signal that deenergizes the motor 30 so that so long as the car speed signal is below the predetermined value, that is the reference value, the switch 60 is maintained closed. Consequently, the motor 30 is continuously energized.

When the car speed is increased above a predetermined value, the voltage supplied to the comparator 22 from the F/V converter 22 exceeds a preset reference value 24, so that the comparator 23 produces a second control signal which opens switch 60, thus stopping the motor 30.

Thus, while the car is stopped and when the steering wheel is not rotated, the motor 30 would not be energized. But when the car is stopped and the steering wheel 13 is rotated, or during running when the car speed is less than a predetermined value, the motor 30 is energized. But when the car speed is higher than a predetermined value, the motor 30 would not be energized regardless of the steering operation. Thus while the car is stopped or the car speed is less than the predetermined speed, the motor 30 is energized to actuate the power steering device 50 so that steering can be made readily. When the car speed is higher than the predetermined value the motor 30 is not energized and the power steering device 50 is not actuated. However, since the steering wheel can be rotated with a small force under a high running speed no trouble would be caused even when the power steering device 50 is not actuated. Further, as the motor 30 is not energized when the car is stopped without steering and when the car is running at a speed higher than a predetermined speed, it is possible to save power necessary to drive the motor.

The above described operations can be summarized as shown by the following Table I.

TABLE I

| | Output of steering angle sensor 12 | Output of car speed sensor 11 | State of switch 70 | State of switch 60 | Motor 30 |
| --- | --- | --- | --- | --- | --- |
| stop | no | no | off | on | off |
| Steering during stop | yes | no | on | on | on |
| low speed running | no or yes | yes | on | on | on |
| high speed running | no or yes | yes | on | off | off |

The relationship between the car speed and the revolution of the pump 40 is shown in FIG. 2.

The steering angle signal can be produced by the steering angle sensor 12 by sensing the angle of rotation of the steering wheel 13. This signal can also be produced by detecting the torque applied to the steering shaft 14 with a steering torque sensor, not shown. Furthermore, the timer 21 may be constituted by a F/V converter and a comparator. Instead of ON/OFF controlling the motor 30, the engine power can be transmitted to or interrupted from the oil pump by ON/OFF controlling an electromagnetic clutch.

Figure 3:
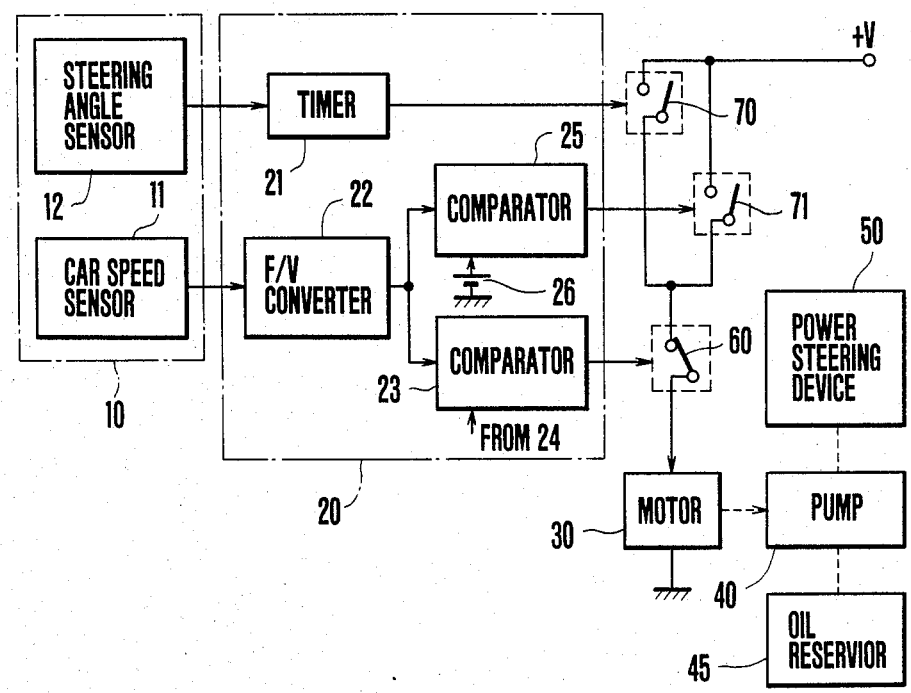
FIGS. 3 and 4 are block diagrams showing other embodiments of this invention.

In the modified embodiment shown in FIG. 3, elements corresponding to those shown in FIG. 1 are designated by the same reference numerals. Comparator 25 shown in FIG. 3 has the same construction as the comparator 23 shown in FIG. 1, but operates such that it would not produce a third control signal that drives the motor in a range in which the car speed is less than an output of a reference signal source 26, that is the second predetermined speed such as several km/h for example (hereinafter, this region is termed an extremely low speed region) whereas when the car speed exceeds the second predetermined speed the comparator 25 produces a motor drive signal. On the otherhand, the comparator 23 generates the second control signal that deenergizes the motor 30 when the car speed becomes a region above the first predetermined speed (hereinafter, this region is termed a high speed region). The first predetermined speed is higher than the second predetermined speed and a region between the first and second predetermined speed is herein defined as a low speed region. A switch 71 is provided which is closed by a third control signal from the comparator 25 only when the car speed is higher than the second predetermined speed.

The modified embodiment shown in FIG. 3 operates as follows. When the car is not running the car speed sensor 11 does not produce any car speed signal so that the F/V converter 22 and the comparators 23 and 25 do not operate whereby the switch 71 is open and the switch 60 is closed. When the steering is not made at this time, the steering angle sensor 12 does not produce a steering signal so that the timer 21 does not operate and the switch 70 is maintained off. Thus, the motor 30 is not energized. When steering is made under this state, the steering angle sensor 12 sends a steering signal to the timer 21, whereby the timer 21 produces a first control signal acting as a motor drive signal. At this time, since the switch 60 is closed, the motor 30 is energized from the source +V.

When the car begins to run, the car speed sensor 11 produces a car speed signal which is converted into direct current by F/V converter 22 and then applied to the comparators 23 and 25. At this time, when the car speed is in the extremely low speed region, both comparators 23 and 25 do not operate so that the on state of the switch 60 and the off state of the switch 71 are maintained. When steering is not made at this time, the switch 70 is also in the off state, so that the motor 30 would not be connected to the source +V. But when the steering is made, the switch 70 is closed to start the motor 30.

As the car speed exceeds the extremely low speed range, the comparator 25 generates a third control signal acting as a motor drive signal to close the switch 71. Accordingly, the motor 30 is started irrespective of the steering operation.

As the car speed further rises to the high speed range, the comparator 23 produces a second control signal acting as the motor stopping signal so that the switch 60 is opened to disconnect the motor 30 from the source +V. At this time, when steering is made the switch 70 is closed, but as the switch 60 is open the motor 30 does not operate.

Consequently, in the extremely low speed range including car stop, other than the steering, the motor 30 does not operate. In the low speed region between the extra low speed range and the high speed range, the motor 30 is always operated, whereas in the high speed region, the motor 30 stops irrespective of the steering. For this reason, in the low speed region including car stop, each time the steering wheel is rotated, power steering is made to ensure ready and smooth rotation of the steering wheel. Although in the high speed region power steering is not made, the steering wheel decreases the steering wheel can be rotated readily since the power necessary to rotate. Thus, the motor 30 is always operated in the low speed region for the purpose of preventing response delay for the rapid steering effected to avoid accident, but the motor 30 is stopped except steering in the extremely low speed region and at the time of the car stop in which response delay does not cause any problem. Moreover in the high speed region too in which power steering is not necessary the motor 30 is stopped whereby the steering wheel can be rotated readily and the power consumption can be decreased than the prior art power steering apparatus.

Like the first embodiment, the steering angle signal can be detected by the angle of rotation of the steering wheel, the steering angle signal can be detected by detecting the torque applied to the steering shaft with a torque sensor, the timer 21 may be constituted by an F/V converter and a comparator, and the motor 30 can be substituted by an electromagnetic clutch which transmits or interrupts power transmission from the engine.

Figure 4:
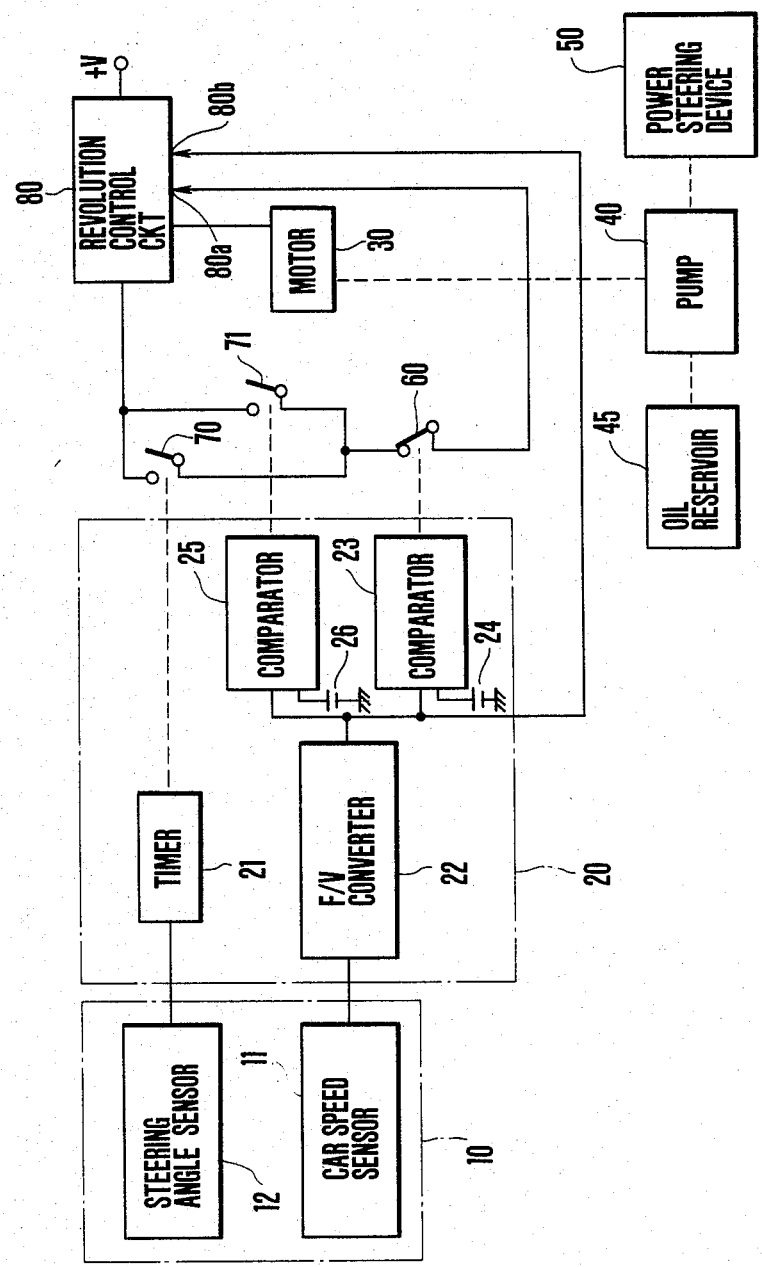

FIG. 4 is a block diagram showing the third embodiment of this invention in which circuit elements identical to or corresponding to those shown in FIGS. 1 and 3 are designated by the same reference numerals. In FIG. 4, reference numeral 80 designates a revolution control circuit which decreases the revolution of the motor 30 as the value of the signal supplied to its input terminal 80b increases while a signal is being supplied to another input terminal 80a. When a signal inputted to the input terminal 30a is interrupted the motor 30 is deenergized irrespective of the signal supplied to the input terminal 30b.

The modified embodiment shown in FIG. 4 operates as follows. When the car is stopped and the steering wheel is not rotated the switch 71 is open so that no signal is applied to the input terminal 80a of the revolution control circuit 80. Consequently, this circuit 80 does not energize the motor 30. When the steering wheel is rotated at this time, the steering angle signal supplied to the timer 21 from the steering angle sensor 12 causes the timer 21 to produce a motor drive signal which closes switch 70 to supply a signal to the input terminal 80a of the revolution control circuit 80. Consequently, the circuit 80 supplies voltage to the motor 30 to start the same.

While the car is running in the extremely low speed range such as to several km/h for example, both comparators 23 and 25 do not operate so that the switch 70 is opened and the switch 60 is closed. Thus, in the extremely low speed region, in the same manner as a case of the car stop, the switch 70 is closed only during steering to supply a signal to the input terminal 80a of the revolution control circuit 80, thus driving motor 30.

When the car speed rises to the low speed region, comparator 25 operates to produce a motor drive signal which closes the switch 71 so that a signal is always supplied to the input terminal 80a of the revolution control circuit 80 irrespective of the steering operation.

At the same time V/F converter 22 supplies to the input terminal 80b of the revolution control circuit 80 a revolution control signal proportional to the car speed. Thus, the revolution control circuit 80 operates to decrease the number of revolutions of the motor 30 as the car speed increases.

As the car speed is further increased to the high speed region, the comparator 23 generates a motor stop signal to open the switch 60, thus interrupting supply of the signal to the input terminal of the revolution control circuit 80, whereby this circuit does not supply voltage +V to the motor 80 to stop the same.

Thus, in the extremely low speed region including car stop, except a case in which the steering operation the motor 30 is not operated, while in the low speed region, the motor 30 is operated irrespective of the steering operation and the revolution of the motor 30 is decreased with increase of the car speed. In the high speed region, the motor 30 is not operated. For this reason, in the extremely low speed region including the car stop, the steering wheel can be rotated with a small force, in the low speed region, an adequate steering can be made in accordance with the car speed, whereas in the high speed region as the steering force is decreased the steering wheel can be rotated smoothly with a small force without relying upon the power steering. Accordingly it is possible to save the power consumption necessary to drive the oil pump 40.

Just in the same manner as in the first embodiment, the steering angle signal can be produced by detecting the rotation angle of the steering wheel, the steering angle signal can be detected with a torque sensor detecting the torque on the steering shaft, and the timer 21 can be made up of an F/V converter and a comparator.

Figure 5:
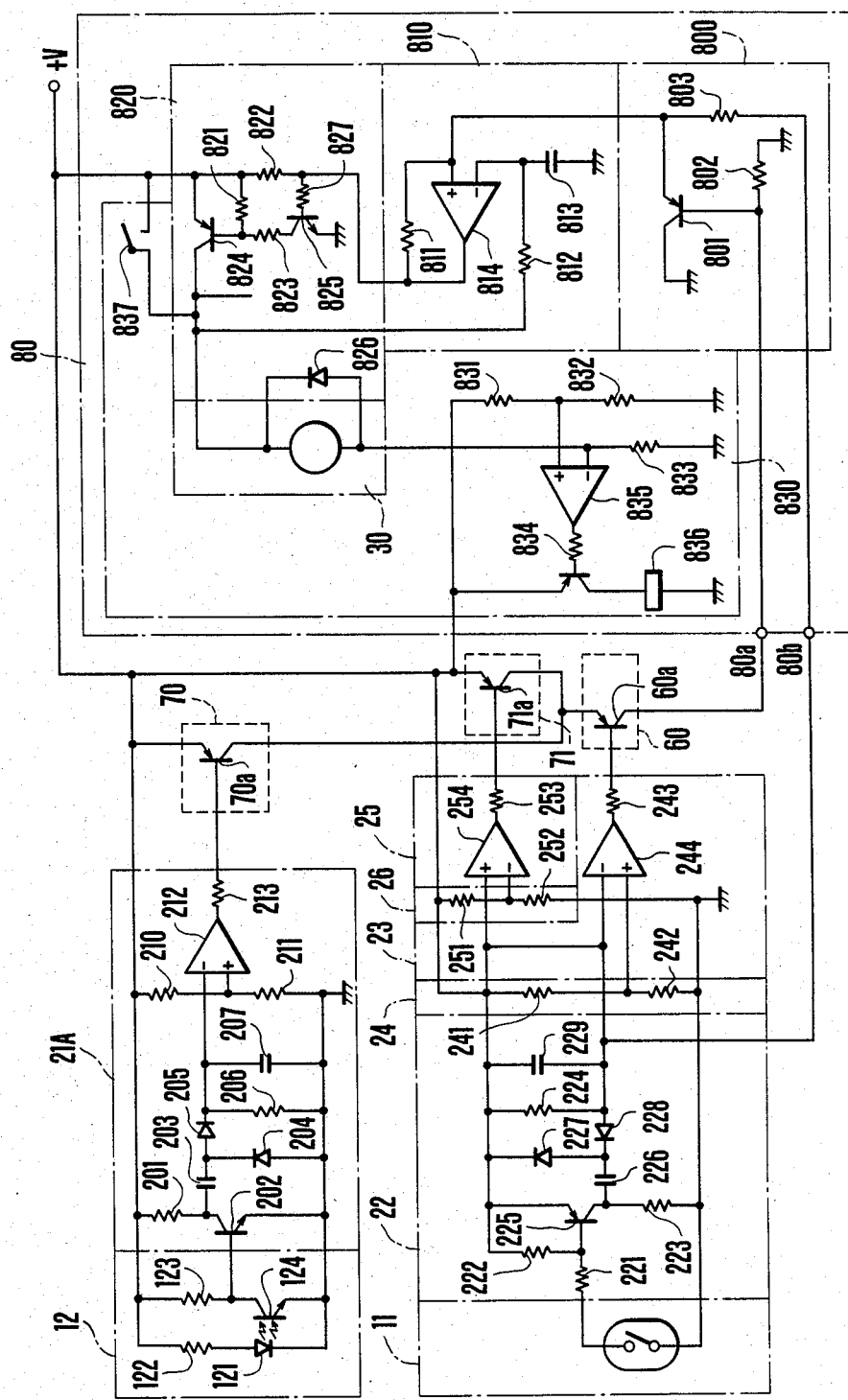
FIG. 5 shows detailed connection of the block diagram shown in FIG. 4.

FIG. 5 shows a connection diagram showing the detail of the embodiment shown in FIG. 4 in which circuit elements corresponding to those shown in FIG. 4 are designated by the same reference numerals. In FIG. 5, the steering angle sensor 12 comprises a light emitting diode 121, resistors 122 and 123, and a phototransistor 124. A rotary disc having a plurality of slots as shown in FIG. 1 is used to control light projected to the phototransistor 124 from the light emitting diode 121 so as to produce a pulse of a number proportional to the steering angle. Block 21A shows a portion corresponding to the timer 21 and constituted by an F/V converter comprising resistors 201, 206, a transistor 202, capacitors 203 and 207, and diodes 204 and 205, and a comparator circuit constituted by resistors 210, 211 and 213 and a comparator 212. The F/V converter converts the steering angle signal into a DC signal proportional to the number of pulses, whereas the output of the comparator circuit changes from "1" to "0" when the voltage of the DC signal exceeds a DC voltage determined by resistors 210 and 211. The F/V converter 22 is constituted by resistor 221, 222, 223 and 224, a transistor 225, a capacitor 226, diodes 227 and 228, and a capacitor 229 so as to convert the car speed signal into DC voltage proportional to the number of pulses.

The comparator circuit 23 is constituted by resistors 241, 242, and 243, and a comparator 244 and operates to produce a motor interruption signal when the ou tput of the comparator 244 changes from "0" to "1" as the output voltage of F/V converter 22 becomes lower than a value determined by resistors 241 and 242. The comparator circuit 25 is constituted by resistors 251, 252 and 253, and a comparator 254. When the output of the F/V converter 22 becomes less than a value determined by resistors 251 and 252, the output of the comparator 254 changes from "1" to "0" so as to produce a motor drive signal. These circuits are constructed such that when the car speed exceeds the first speed, that is the upper limit of the extremely low speed region, the output voltage level of the comparator 254 reverses, and when the car speed exceeds the second speed, that is the upper limit of the low speed region, the output voltage level of the comparator 244 reverses.

Transistors 60a, 70a and 71a acts as the switches 60, 70 and 71, respectively.

The revolution controller 80 is constituted by a switch circuit 800, a car speed sensor 830, a voltage regulator 820, and an overcurrent protective circuit 83a. The switch circuit 800 comprises a transistor 801, and resistors 802 and 803. When the signal is supplied to the input terminal 80a, the transistor 801 is turned OFF by a bias voltage produced across the resistor 802, and the signal supplied to the input terminal 80b is supplied to the car speed sensor 810 via resistor 803, whereas, when the signal inputted to the input terminal 80a disappears, the transistor 801 is turned ON to stop supply of the signal to the car speed sensor 810. The car speed sensor 810 is constituted by resistors 811, 812 and a capacitor 813 and a comparator 814 for producing a pulse train varying its duty cycle in accordance with the value of voltage supplied to the non-inverting input terminal of the comparator 814. The voltage regulator 820 comprises resistors 821, 822, 823 and 827, transistor 824 and 825 and a diode 826 and operates to supply a high voltage to the motor 30 at the time of a high duty cycle, whereas a low voltage to the motor 30 at the time of a low duty cycle in accordance with the pulse train from the car speed sensor 810. The overcurrent protective circuit 830 is constituted by resistors 831, 832, 833 and 834, a comparator 835, and a relay 836 with a contact 837, when the motor 30 is overloaded, the relay 836 operates to close its contact 837 so as to shortcircuit the transistor 824, thus protecting the same against overcurrent.

As has been described with reference to FIG. 3, the circuit shown in FIG. 5 operates as follows. Thus, when the car runs in the extremely low speed region and when the steering wheel is not operated, the transistor 60a is ON and the transistors 70a and 71a are OFF so that transistor 801 is turned ON to ground the non-inverting input terminal of the comparator 814. Consequently, the car speed sensor 810 does not produce a pulse and the voltage regulator 820 does not supply voltage to the motor 30. When steering is made under these states, transistor 70a is turned ON which in turn turns OFF transistor 801. Accordingly, the car speed sensor 810 generates a pulse and the voltage regulator 820 supplies voltage to the motor 30 to start the same. While the car speed is in the extremely low speed region, the transistor 71a is continuously maintained OFF so that the motor 30 operated only at the time of steering.

As the car speed increases to a low speed region transistor 71a is turned ON, thus rendering OFF transistor 71a irrespective of the steering. Since a DC voltage proportional to the car speed is supplied to the car speed sensor 810 from the F/V converter 22, the number of pulses generated by the car speed sensor 810 increased as the DC voltage supplied thereto increases. Thus, the voltage supplied to the motor 30 decreases as the car speed increases, thus decreasing the revolutions of the motor 40.

As the car speed increases further to reach the high speed region, the transistor 60a is turned OFF which in turn turns ON the transistor 801 so that the car speed sensor 810 stops to generate the pulse to deenergize the motor 30.

The relationship between the car speed and the revolution of the pump 40 is shown in FIG. 6. In this case the reference voltage 26 is determined so that when the car speed is over 5 km/h the comparator 25 outputs the motor drive signal, and the reference voltage 24 is determined so that when the car speed becomes about 45 km/h the comparator 23 outputs the second control signal. The curve a represented by the solid line shows a no-load characteristic when the car runs straight without the steering operation, while the curve b represented by the dotted line a characteristic when the steering is made.

In FIG. 5 when the comparator 23 is eliminated and the switch 60 is shortcircuited, even the car is not running the motor 30 would not be operated while the steering wheel is not rotated. But when the steering wheel is rotated the motor 30 is operated and during running the motor 30 is operated irrespective of the steering operation and its speed can be decreased as the car speed increases.

It should be understood that the invention is not limited to the specific embodiments described above and that many changes and modifications can be made.

FIG. 7 shows a modification of FIG. 1 in which only the output of the steering angle sensor 12 is applied to the timer 21, whereas the output of the car speed sensor 11 is applied only to the F/V converter 23 which supplies its output to comparator 24 and to the output terminal of timer 21 as the first control signal in the same manner as in FIG. 1. The operations of the switches 60 and 70 and the power steering device 50 are the same as those shown in FIG. 1.

Figure 8:
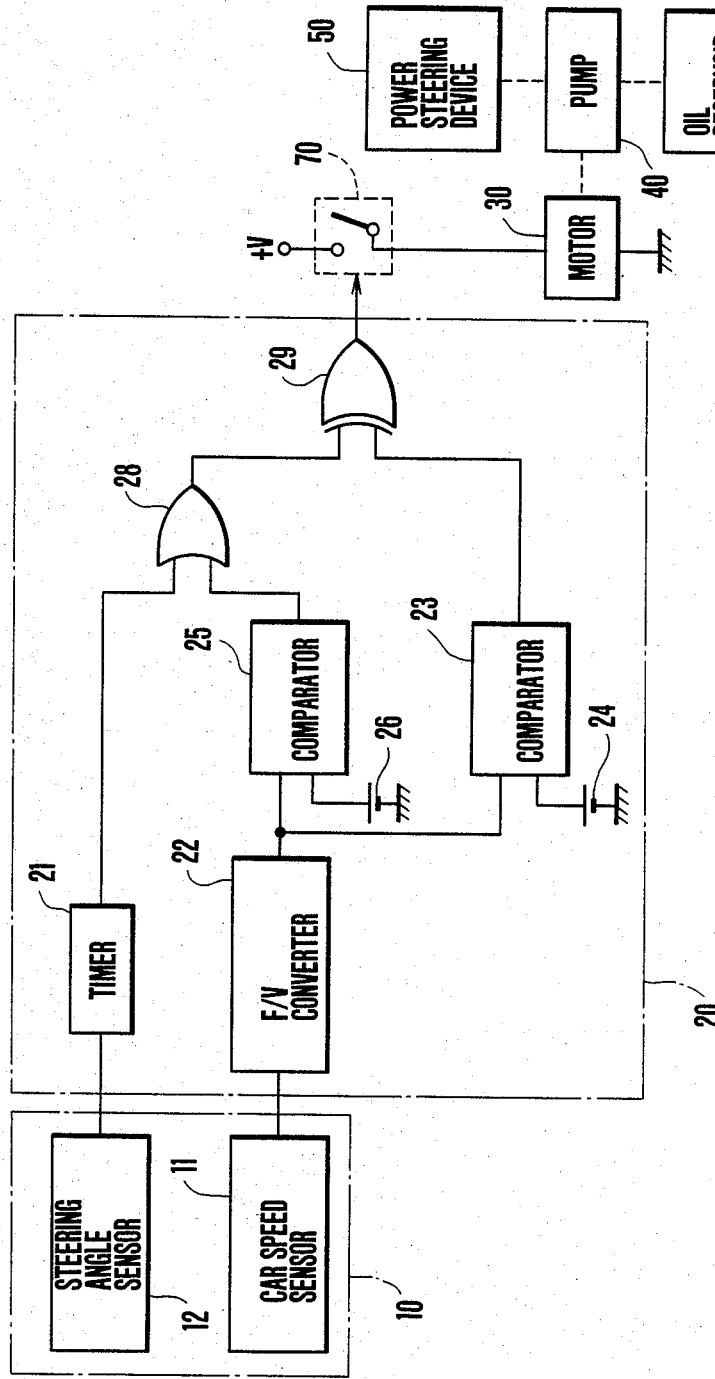

FIG. 8 shows a modification of FIG. 3 in which the control circuit 20 is constructed such that the switch 70 is used to start and stop the motor. In addition to timer 21, F/V converter 22 and the comparators 23 and 25, the control circuit 20 comprises an OR gate circuit 28 inputted with the outputs of the timer 21 and of the comparator 25, and an exclusive-OR gate circuit 29 supplied with the outputs of the OR gate circuit 28 and of the comparator 23.

In operation, when the car is stopped and the steering wheel is not rotated both the car speed sensor 11 and the steering sensor do not produce outputs. Under this condition, no input signals are applied to the OR gate circuit 28 so that no input signals are applied to the exclusive-OR gate circuit 29. Therefore, this exclusive-OR gate circuit 29 does not send out an output and the switch 70 is held open. Accordingly, the motor 30 is not energized with the result that the power steering device 50 would not be actuated.

When the steering wheel is rotated under this state, the steering angle sensor 12 produces an output and the output of the timer 21 is applied to one input terminal of the OR gate circuit 21. Consequently, the exclusive-OR gate circuit 29 closes the switch 70 to start the motor 30 for actuating the power steering device 50.

When the car starts, the output of the F/V converter 22 exceeds a reference value 26 during the low speed running at which the output of the comparator 22 is lower than another reference value 24. Then the OR gate circuit 28 supplies its output to the exclusive-OR gate circuit 29. At this time since the comparator 23 does not produce an output, the exclusive-OR gate circuit 29 produce an output for closing switch 70. Thus the motor 30 is energized to actuate the power steering device 50.

While the comparator 25 produces an output, the exclusive-OR gate circuit 29 produces an output to close the switch irrespective of the presence or absence of the output of the steering sensor 12.

As the car enters into a high speed running and the output of the converter 22 becomes larger than the reference value 24, both comparator 23 and 25 produces outputs which are supplied to the exclusive-OR gate circuit 29 to open the switch 70, thus stopping the motor 30 to disable the power steering device 50.

These operations can be summarized as shown in the following Table II.

TABLE II

| | Output of steering angle sensor 12 | Output of car speed sensor 11 | Output of timer 21 | Output of comparator 25 | Output of comparator 23 | State of switch 70 |
|---|---|---|---|---|---|---|
| stop | no | no | no | no | no | off |
| Steering during stop | yes | no | yes | no | no | on |
| low speed running | no or yes | yes | no or yes | yes | no | on |
| high speed running | no or yes | yes | no or yes | yes | yes | off |

What is claimed is:

1. A power steering apparatus comprising a power steering device, an oil pump for actuating the power steering device, a sensor device for detecting the running state of a motor car, a control device for controlling said pump in accordance with an output of said sensor device, said control device driving said pump when said sensor device detects the car speed is lower than a predetermined value and when said car is at a standstill and said steering wheel is being rotated and stops said pump when said sensor device detects that the car speed is above said predetermined value and when said car is at a standstill and the steering wheel of the motor car is not being rotated.

2. The power steering apparatus according to claim 1 wherein said sensor device comprises a speed sensor for producing a speed signal corresponding to the car speed, and a steering angle sensor for generating a steering signal corresponding to a steering angle of the steering wheel.

3. The power steering apparatus according to claim 2 wherein said steering angle sensor comprises a code disc secured to a steering shaft of the steering wheel and provided with a plurality of slits, and a light projector and a light receiver on the opposite sides of said code disc.

4. The power steering apparatus according to claim 1 wherein said pump is driven by a motor to which a voltage source is connected through a switch means controlled by said control device.

5. The power steering apparatus according to claim 4 wherein said switch means comprises first and second switch connected in series between said voltage source and said motor, states of said first and second switches being normally held in reverse, said first switch being made closed while the car is running and the steering wheel is operated, and said second switch being made open when the car speed exceeds said predetermined value.

6. The power steering apparatus according to claim 5 wherein said control device comprises a first control means for generating a first control signal while either one of a steering signal and a car speed signal generated from said sensor device is received, and a second control means for generating a second control signal to stop said pump when the car speed exceeds the predetermined value.

7. The power steering apparatus according to claim 4 which further comprises a revolution control circuit for controlling the revolution of said motor in response to the car speed.

8. The power steering apparatus according to claim 4 wherein said switch means comprises first and second switches and said control device comprises a first control means for generating a first control signal to send it said first switch so as to drive said pump while either one of a steering signal and a car speed signal generated from said sensor device is received, and a second control means for generating a second control signal to send it said second switch so as to stop said pump when the car speed exceeds the predetermined value.

9. A power steering apparatus comprising a power steering device, an oil pump for actuating the power steering device, a sensor device for detecting the running state of a motor car, a control device for controlling said pump in accordance with an output of said sensor device, said control device driving said pump when said sensor device detects the car speed is lower than a predetermined value and stops said pump when said sensor device detects that said car is at a standstill and the steering wheel of the motor car is not being rotated, wherein said pump is driven by a motor to which a voltage source is connected through a switch means controlled by said control device, wherein said switch means comprises first and second switch connected in series between said voltage source and said motor, states of said first and second switches being normally held in reverse, said first switch being made closed while the car is running and the steering wheel is operated, said second switch being made open when the car speed exceeds said predetermined value, wherein said control device comprises a first control means for generating a first control signal while either one of a steering signal and a car speed signal generated from said sensor device is received, a second control means for generating a second control signal to stop said pump when the car speed exceeds the predetermine value, wherein said first control means comprises an OR gate circuit supplied with the steering signal and the car speed signal and a one shot circuit connected to an output of said OR gate circuit for generating the first control signal, said second control means comprises a frequency/voltage converter supplied with the car speed signal to produce a DC voltage corresponding to the car speed signal, and a comparator for comparing the DC voltage with the predetermined value to generate the second control signal.

10. A power steering apparatus comprising a power steering device, an oil pump for actuating the power steering device, a sensor device for detecting the running state of a motor car, a control device for controlling said pump in accordance with an output of said sensor device, said control device driving said pump when said sensor device detects the car speed is lower than a predetermined value and stops said pump when said sensor device detects that said car is at a standstill and the steering wheel of the motor car is not being rotated, wherein said pump is driven by a motor to which a voltage source is connected through a switch means controlled by said control device, said switch means comprises first and second switches connected in series between said voltage source and said motor, and a third switch connected in parallel with said first switch, states of said first and third switches and said second switch being normally held in reverse, said first switch being made closed to drive said pump while steering wheel is operated, said second switch being made open to stop said pump when the car speed exceeds said predetermined value, and said third switch being made closed to drive said pump when the car speed exceeds another predetermined value which is an extremely low speed below the former predetermined value.

11. The power steering device according to claim 10 wherein said control device comprises a first control means for continuously generating a first control signal while a steering signal is received, a second control means for generating a second control signal to stop said pump when the car speed exceeds the predetermined value, and a third control means for generating a third control signal to drive said pump when the car starts to run and the car speed exceeds said another predetermined value.

12. A power steering apparatus comprising a power steering device, an oil pump for actuating the power steering device, a sensor device for detecting the running state of a motor car, a control device for controlling said pump in accordance with an output of said sensor device, said control device driving said pump when said sensor device detects the car speed is lower than a predetermined value and stops said pump when said sensor device detects that said car is at a standstill and the steering wheel of the motor car is not being rotated, wherein said pump is driven by a motor to which a voltage source is connected through a switch means controlled by said control device, wherein said control device comprises an F/V converter for converting a signal of the car speed from said sensor device into a DC voltage, a first comparator for comparing the DC voltage with the predetermined value, a second comparator for comparing the DC voltage with another predetermined value which is an extremely low speed below the former predetermined value, an OR gate circuit for receiving the steering signal and an output of said second comparator, and an exclusive-OR gate circuit for receiving outputs of said OR gate circuit and said first comparator to produce a control signal which controls ON/OFF operation of said switch.

* * * * *